Sept. 4, 1928.

Q. CLIMER 1,683,024

BEAN SNIPPING MACHINE

Filed July 30, 1927   2 Sheets-Sheet 1

INVENTOR
Quincy Climer
BY
Cooper, Kerr & Dunham
ATTORNEYS

Sept. 4, 1928.
Q. CLIMER
1,683,024
BEAN SNIPPING MACHINE
Filed July 30, 1927    2 Sheets-Sheet 2
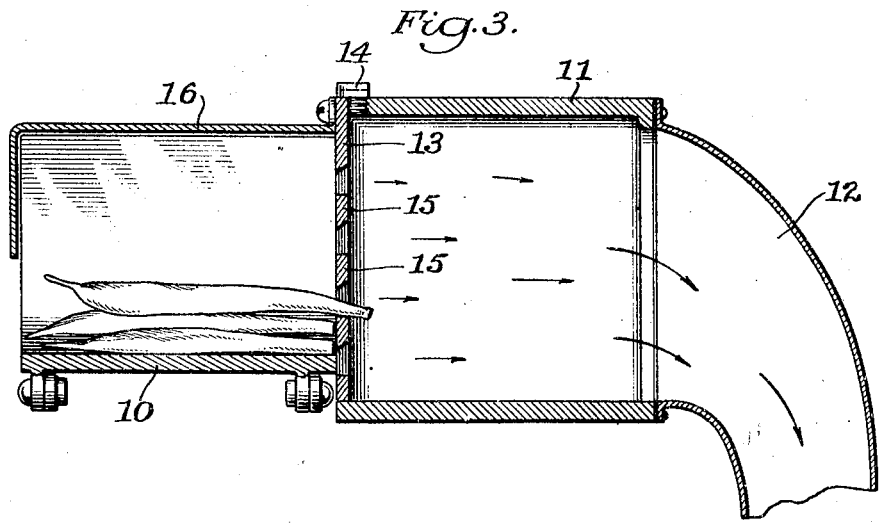
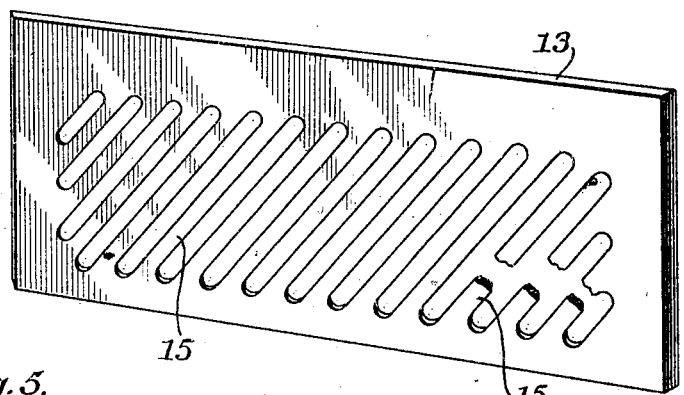
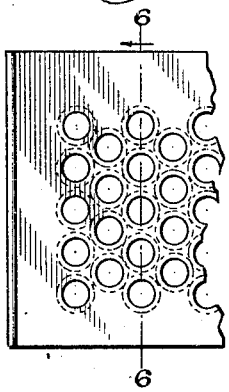
INVENTOR
Quinby Climer
BY
Cooper, Kerr & Dunham
ATTORNEYS Patented Sept. 4, 1928.

1,683,024

UNITED STATES PATENT OFFICE.

QUINBY CLIMER, OF CHILLICOTHE, OHIO, ASSIGNOR OF ONE-HALF TO CHARLES M. HAYNES, OF CHILLICOTHE, OHIO.

BEAN-SNIPPING MACHINE.

Application filed July 30, 1927. Serial No. 209,409.

This invention relates to machines for snipping or cutting the ends off of string beans preparatory to cooking, and relates more particularly to machines in which the beans are carried in the buckets of a conveyor (which may be of the flexible type running over sprockets, rollers, or the like, or of the rigid type on a wheel or drum) past a cutter which cuts off the laterally protruding ends of the beans. The beans may be caused to protrude from the open sides of the buckets in various ways as for example by tilting the conveyor so that the beans move outwardly by gravity, or by means of suction exerted at a convenient point in the travel of the conveyor. The present invention is designed to improve machines of the conveyor type in the direction of simplicity and effectiveness, and to this and other ends the invention comprises the novel features and combinations hereinafter described.

In carrying out the invention in the preferred manner suction is employed to shift the beans transversely of the conveyor into position to cooperate with the cutting or snipping means. The suction is applied through what is known as a "suction box", arranged alongside of the conveyor, so that as the beans are carried past the box the strong current of air entering the latter will draw them partly out of the laterally open conveyor buckets or receptacles. In prior machines the outward movement is limited by mechanism in the suction box itself, which mechanism is intended to pass the beans along to the cutter, in the form, usually, of a revolving disk. In the present invention it is not necessary to use such mechanism in the suction box, or a cutter distinct from the box. On the contrary in this invention the front of the box, across which the conveyor travels, is closed, by a cutter plate, having openings into which the tips of the beans are drawn by the suction and are cut off by the sharp edges of the openings. These openings may be of a suitable shape, as for example round holes, countersunk from the rear to provide cutting edges, or slots having their forward edges beveled.

Referring now to the accompanying drawings,

Fig. 3 is a cross section about on line 3—3 of Fig. 2.

Fig. 4 is a perspective view of a cutter plate in which the openings are in the form of inclined slots.

Fig. 5 is a fragmentary front view of a cutter plate having round holes countersunk from the rear to provide cutting edges.

Fig. 6 is a section on line 6—6 of Fig. 5.

Figure 1:
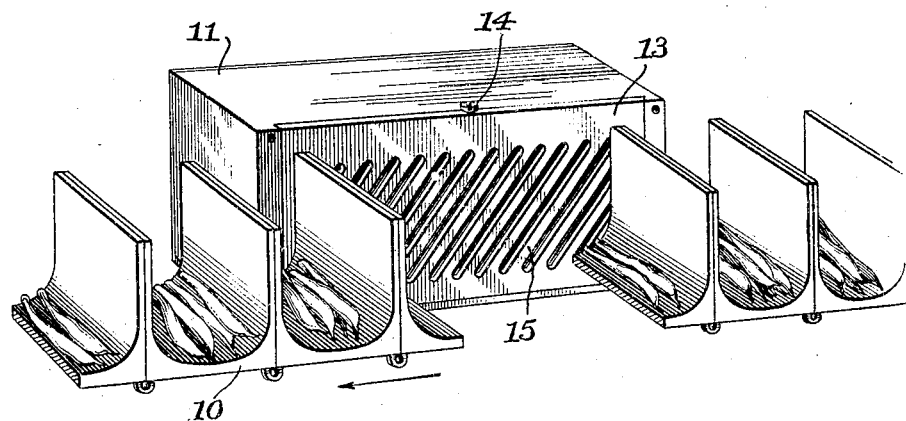
Fig. 1 is a perspective view showing the suction box and cutter plate, with a portion of the traveling conveyor in front of the box.
Figure 2:
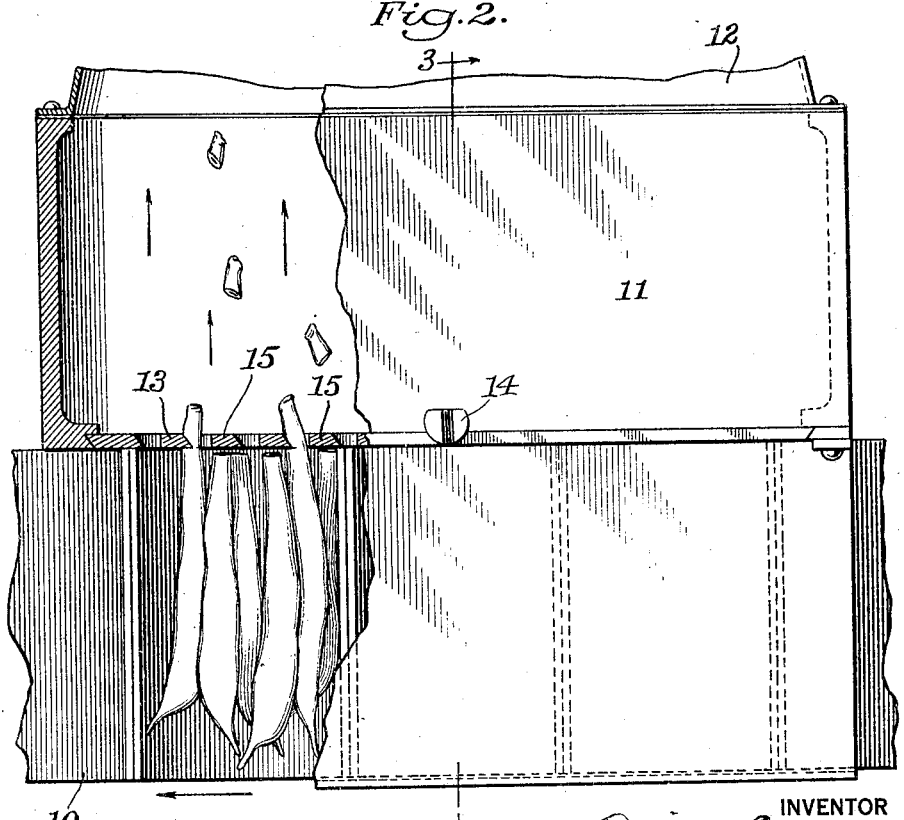
Fig. 2 is a plan view of the apparatus shown in Fig. 1, partly in horizontal section and with the addition of a hood which may be used to enclose the conveyor in its travel past the suction box.

As indicated in Figs. 1 and 2 the beans are carried in the open buckets of the conveyor 10, past the front of the suction box 11. Devices for depositing the beans in the buckets and for driving the conveyor are well known in the art and hence need not be illustrated or described herein. Suffice it to say that any suitable and convenient means for the purpose may be employed. Likewise any suitable means may be used to create the suction through the suction box, in the direction of the arrows, Figs. 2 and 3, as for example an exhaust fan (not shown) connected to a draft pipe 12 attached to the rear of the suction box.

The cutter plate 13 is mounted in grooves in the front of the suction box for easy removal and replacement by vertical movement, and may be held in place by any suitable locking arrangement, as for example a half-head screw 14. The slots in the plate may be inclined downwardly and forwardly (in the direction of the conveyor's travel) providing similarly inclined cutting bars 15, having their forward edges beveled as shown to provide cutting or shearing edges.

When the beans reach the suction box the powerful draft sucks them into the slots, and the subsequent continued movement of the conveyor carrying the beans causes their tips, protruding through the slots, to be sheared off by the cooperation of the cutting bars and the advancing rear edge of the bucket in contact with or close to the plate. If a bean is not drawn into the first slot encountered it will be drawn into one or another farther along, the cutter plate being for that purpose made long enough to cover several buckets.

The length of the tip cut off depends on the size or degree of taper of the bean and on the width of the slots in the cutter plate, that is, the space between the cutter bars.

In order to avoid the waste incident to cutting off unnecessarily long tips the beans may be graded as to size, and several cutter plates may be provided, having different spacing of the cutter bars, so that plates of appropriate spacing may be used for the different bean sizes. The downward and forward slope of the bars not only prevents the beans from riding up on the bars, but also has a tendency to cam the beans downwardly and backwardly thus insuring their being cut off as the bucket advances. On the other hand it may be in some cases advantageous to have the bars slope rearwardly and upwardly. In that case if the beans ride up on the bars the beans are agitated more or less, thereby loosening the beans and permitting any that may be lagging behind the suction to be drawn out into the gauge openings.

If desired the suction box may be provided with an open ended hood 16, through which the conveyor passes, to concentrate the suction more or less at the bottom of the buckets and thus give a more efficient utilization of the air current.

In the cutter plate shown in Figs. 5 and 6 the openings into which the beans are drawn are circular openings of suitable size, forming cutting "bars" between them. The cutting edges are produced by giving the holes a rearward flare, as by simple countersinking.

If it is desired to snip both ends of the beans in the same machine, without removing the beans and passing them through the machine a second time, two suction boxes, each with a suitable cutter plate, may be provided, one in advance of the other on opposite sides of the conveyor, as will be readily understood.

It is to be understood that the invention is not limited to the specific construction herein illustrated and described but can be embodied in other forms without departure from its spirit as defined by the following claims.

I claim—

1. In a bean snipping machine, in combination, a traveling conveyor having open ended buckets for the beans, a suction box past which the beans are carried by the conveyor, and a cutter plate on the front of the suction box, having openings into which the beans are drawn by the suction, said openings having cutting edges to shear off the tips of the beans as they travel.

2. In a bean snipping machine, in combination, a traveling conveyor having open ended buckets for the beans, a suction box past which the beans are carried by the conveyor, and a cutter plate having gauging openings into which the beans are drawn by the suction until arrested by the taper of the beans, said gauging openings having cutting edges to shear off the tips of the beans as the latter are carried past by the conveyor.

3. In a bean snipping machine, in combination, a traveling conveyor having open ended buckets for the beans, a suction box arranged alongside the path of the conveyor and extending lengthwise over a plurality of buckets, and a combined cutter and gauge plate closing the front of the suction box, provided with gauging apertures to limit the lateral movement of the beans under the influence of the suction, said apertures having cutting edges cooperating with the advancing rear edges of the buckets for shearing off the tips of the beans protruding through said apertures.

4. In a bean snipping machine, in combination, a gauge and cutter plate having openings to admit beans as far as their taper will permit, the portions of the plate between said openings being provided with cutting edges, a traveling conveyor moving past the plate in contact therewith, to carry the beans and permit lateral movement thereof into the said openings, and means for causing such lateral movement of the beans.

5. In a bean snipping machine, in combination, a traveling conveyor for the beans, and a suction box having at its front a plate provided with slots inclined downwardly in the direction of travel of the conveyor, the forward edges of the slots being beveled to form cutting edges.

6. A combined gauge and cutter plate for bean snipping machines, having inclined cutter bars spaced apart to admit the tips of the beans between them, the downwardly directed edges of the bars being beveled, in combination with bean-conveying means movable past the gauge and cutter plate and constructed to permit longitudinal movement of the beans into engagement with the cutter bars.

7. A suction box for bean snipping machines, having at its front a combined gauge and cutter plate provided with bevel-edged openings to admit the tips of the beans, and a conduit at the rear of the box for connection with suction-producing means.

8. A suction box as described in claim 7, in which the gauge and cutter plate is removably fitted in grooves at the ends of the box for vertical removal and replacement.

9. A combined gauge and cutter plate for bean-snipping machines, having openings bounded at least in part by cutting edges and adapted to admit only the tips of the beans, in combination with bean-conveying means movable past the gauge and cutter plate, said bean-conveying means being adapted to permit longitudinal movement of the beans into said openings in the plate.

In testimony whereof I hereto affix my signature.

QUINBY CLIMER.